(12) United States Patent
Stern et al.

(10) Patent No.: US 11,620,614 B2
(45) Date of Patent: Apr. 4, 2023

(54) DETECTING REPLENISHMENT EVENTS AND GENERATING ORDER RECOMMENDATIONS

(71) Applicant: GPCP IP Holdings LLC, Atlanta, GA (US)

(72) Inventors: Dani Itzhak Stern, Atlanta, GA (US); Bradley Lewis Wile, Atlanta, GA (US); Erik Allen Cordsen, Suwanee, GA (US)

(73) Assignee: GPCP IP Holdings LLC, Atlanta, GA (US)

( * ) Notice: Subject to any disclaimer, the term of this patent is extended or adjusted under 35 U.S.C. 154(b) by 175 days.

(21) Appl. No.: 17/085,702

(22) Filed: Oct. 30, 2020

(65) Prior Publication Data
US 2021/0133675 A1    May 6, 2021

Related U.S. Application Data (60) Provisional application No. 62/927,995, filed on Oct. 30, 2019.

(51) Int. Cl.
*G06Q 10/08* (2012.01)
*G07F 9/00* (2006.01)
*G06Q 10/0875* (2023.01)

(52) U.S. Cl.
CPC ......... *G06Q 10/0875* (2013.01); *G07F 9/002* (2020.05)

(58) Field of Classification Search
CPC .................................................. G06Q 10/087
See application file for complete search history.

(56) References Cited

U.S. PATENT DOCUMENTS

| | | | |
|---|---|---|---|
| 2015/0177917 A1* | 6/2015 | Hoekstra | G07F 9/009 715/771 |
| 2016/0116303 A1* | 4/2016 | Rose | G01D 4/004 702/188 |
| 2017/0169446 A1* | 6/2017 | Li | G06Q 10/087 |
| 2020/0210968 A1* | 7/2020 | Mojtahedzadeh | G06Q 10/063116 |

* cited by examiner

*Primary Examiner* — Allen C Chein (57) ABSTRACT

Disclosed are systems and methods for detecting when a dispenser, or an automated dispenser system, of a consumable product is replenished. Embodiments of the disclosure are also directed to systems and methods that facilitate ordering additional inventory of a consumable product that is consumed during a time period.

20 Claims, 6 Drawing Sheets

DETECTING REPLENISHMENT EVENTS AND GENERATING ORDER RECOMMENDATIONS

CROSS-REFERENCE TO RELATED APPLICATIONS

This application claims the benefit of U.S. Provisional Application No. 62/927,995, filed Oct. 30, 2019 and entitled "SYSTEMS AND METHODS FOR AUTOMATED TRACKING AND REORDERING OF WASHROOM CONSUMABLES," the contents of which are incorporated by reference herein in its entirety.

BACKGROUND

Automated dispensers are utilized in various environments to facilitate and optimize dispensing of consumable products, such as paper towels, gels, liquids, gases, aerosols, foams, and other consumables. In a facility, such as an office building, airport, stadium, consumable products require replenishment from time to time. Facilities management, as a best practice, generally attempts to replenish consumable products in a fleet of dispensers in a manner that minimizes waste but without degrading the user experience so that users do not have to experience an empty dispenser.

As the traffic and scope of a facility can be quite large, the waste of consumable products dispensed by dispensers can amount to a considerable expense. For example, if every roll of sheet product in a dispenser were replaced when the roll is fifty percent consumed, this practice would result in considerable waste from a cost and environmental perspective. While such a practice would provide an acceptable end-user experience because users would never experience an empty dispenser, the cost of implementing this practice in a large scale facility could be undesirable from a cost perspective.

Additionally, facilities management is tasked with stocking an inventor of consumable product for use in a fleet of dispensers. With manual dispensers, facilities management may not have granular or good data about how much of a consumable product was used in a given time period when replenishing an inventory of supplies of the consumable products for use in the dispensers deployed by the facility. Therefore, there exists a need for solutions that can help minimize the waste of consumable products that are dispensed in a facility while also facilitating replenishment of an inventory of consumables for the facility.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to systems and methods for detecting when a dispenser, or an automated dispenser system, of a consumable product is replenished. Embodiments of the disclosure are also directed to systems and methods that facilitate ordering additional inventory of a consumable product that is consumed during a time period. Automated or manual dispensers or dispenser systems can be used in various settings to dispense consumable products such as sheet product, paper towels, or tissues. The term "sheet product" is inclusive of natural and/or synthetic cloth or paper sheets. Further, sheet products can include both woven and non-woven articles. Examples of sheet products include, but are not limited to, wipes, napkins, tissues, and towels. Dispensers can also be utilized to dispense liquids, aerosols, or gels in various environments.

Dispensers can be deployed in various environments, such as washrooms, lobbies, offices, or other environments. Dispensers can be deployed in various types of facilities, such as office buildings, transportation terminals, public facilities, and the like. In various environments, a fleet of multiple dispensers across different areas of a building can be used. Dispensers can house and dispense, either manually or automatically, different types of consumable products. Facilities personnel are typically tasked with the maintenance and replenishment of consumable product in the various dispensers in a facility.

Several issues can arise with respect to replenishment of consumable product in a dispenser. First, a dispenser may or may not be refilled before the consumable product in the dispenser is exhausted, which can degrade the user experience. In a washroom environment, for example, a paper towel, toilet paper, soap, or sanitizer dispenser that is empty when a user attempts to use the dispenser is a poor user experience.

Also, dispensers that are refilled too often to avoid an empty dispenser can lead to waste of consumable products that are used in the dispenser. For example, replacing a paper towel roll when the roll is only fifty percent consumed results in waste of the unused paper towel roll, as the unused portion of the paper towel roll is typically not reused in most deployments.

Dispensers can be equipped with product level sensors that can detect the current level of consumable product that exists within the dispenser. For example, a paper towel sensor can have a sensor that detects an approximate percentage that remains of a roll of sheet product that is installed in the dispenser. A soap dispenser can detect an approximate percentage that remains of a liquid soap that is installed in the dispenser. In this sense, a product level sensor can act as a fuel gauge that detects how much consumable product remains in a dispenser.

Dispensers can be setup to periodically report data from one or more product level sensors to a management system. In some implementations, dispensers can report product level data to a hub device that is within a facility in which the dispensers are installed, and the hub device can forward product level data to a remotely executed management system. For example, a management system can be executed remotely in a cloud-based environment that can communicate with hub devices installed locally at a facility in which the dispensers are installed.

The dispensers in the facility can report product level data detected by sensors that sense the remaining levels of consumable products in the dispensers. The dispensers can report product level data to hub devices located at the facility, which can forward the product level data and identifying information about the respective dispensers to the management system.

Examples of the disclosure can also create order recommendations for restocking consumable products that were consumed by the dispensers in a given time period. The order recommendations can be generated based upon the consumption detected in the dispensers over the given time period.

Figure 1:
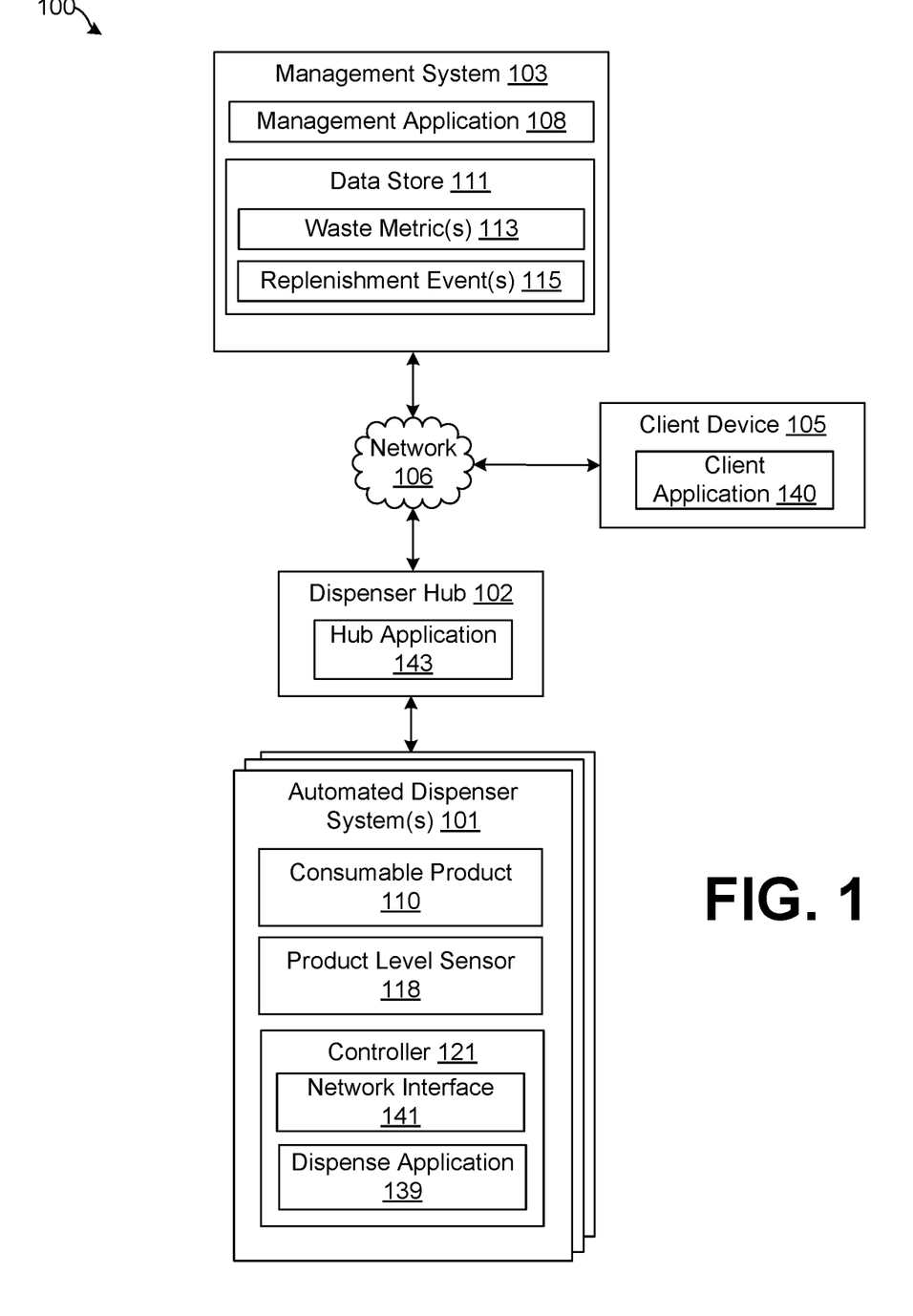
FIG. 1 is a drawing of an example environment according to embodiments of the disclosure.

Referring next to FIG. 1, shown is an example environment 100 in which an automated dispenser system 101 can be deployed. The environment 100 can include one or more automated dispenser system 101, one or more dispenser hub 102, a management system 103, a client device 105, and potentially other devices that are connected to a network 106. The automated dispenser system 101 shown in FIG. 1 can represent a population of many automated dispenser systems 101 that are deployed in a facility. The automated dispenser system 101 can communicate with a dispenser hub 102 that is installed at the facility and that has a network interface to communicate with the network 106.

The dispenser hub 102 can communicate with the management system 103 on behalf of one or more automated dispenser system 101 that are managed by the management system 103. In some implementations, the dispenser hub 102 can carry out or communicate management commands to an automated dispenser system 101 on behalf of a management system 103 because an automated dispenser system 101 may not be equipped with a network interface to communicate directly with the management system 103 over the network 106.

In some implementations, the management system 103 can be located at a facility in which the automated dispenser system 101 is installed and communicate with another management system 103 that is remotely located from the facility. In this configuration, a locally installed management system 103 can act as a local management agent on behalf of a management system 103 that is remote from the facility.

The network 106 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. In some embodiments, the management system can be part of a local network and be positioned on the same local network as the automated dispenser system 101. In other embodiments, the management system 103 can be remote from the automated dispenser system 101. The management system 103 can also include or be operated as one or more virtualized computer instances. For purposes of convenience, the management system 103 is referred to herein in the singular. Even though the management system 103 is referred to in the singular, a plurality of management systems 103 can be employed in various arrangements.

The components executed on the management system 103 can include a management application 108 as well as other applications, services, processes, systems, engines, or functionality not discussed in detail herein. The management application 108 can represent an application or service that can remotely manage one or more automated dispenser systems 101, dispenser hub 102, and obtain product level data from sensors associated with an automated dispenser system 101.

The data store 111 can include any storage device or medium that can contain, store, or maintain the data for use by or in connection with the management application 108. The data store 111 can be a hard drive or disk of a host, server computer, or any other system providing storage capability. While referred to in the singular, the data store 111 can include a plurality of storage devices that are arranged in one or more hosts, server banks, computer banks, or other arrangements. The data store 111 can include any one of many physical media, such as magnetic, optical, or semiconductor media. More specific examples include solid-state drives or flash memory.

The data stored in the data store 111 can include waste metrics 113 and replenishment events 115. The data store 111 can also store more general usage data that corresponds to usage of one or more automated dispenser system 101 managed by the management system 103. A replenishment event 115 is an event that is determined by the management application 108 to correspond to a replenishment or replacement of consumable product within an automated dispenser system 101. The management application 108 can perform an analysis on product level data received from an automated dispenser system 101 to determine whether the consumable product in the automated dispenser system 101 has been replaced or replenished by facilities staff. The analysis can identify when a peak in sensor readings from an automated dispenser system 101 corresponds to a replenishment event 115 by performing a false positive analysis. The false positive analysis can account for sensor variation or temporary malfunction, jostling of the sensor causes a peak in sensor data, and other factors that could potentially cause a false positive detection of a replenishment event 115. A false positive replenishment event 115 would result in unnecessary waste by potentially causing excess inventory of consumable product to be ordered.

A waste metric 113 can be calculated by the management application 108 for an automated dispenser system 101 that is managed by the management system 103. The waste metric 113 can be calculated whenever a replenishment event 115 occurs. The waste metric 113 can represent a percentage or amount of consumable product that is wasted when the consumable product is replenished in an automated dispenser system 101. As noted above, a supply of consumable product is often replaced before it is completely exhausted in the automated dispenser system 101. Therefore, a waste metric 113 can represent an amount or percentage of a consumable product that is unused when a replenishment event 115 occurs and the consumable product in the automated dispenser system 101 is replaced.

The management application 108 can calculate waste metrics 113 and process sensor data from one or more automated dispenser system 101 to identify replenishment events 115. Additionally, the management application 108 can generate order recommendations for replenishment of consumable product inventory to stock an inventory of consumables for a facility based upon the usage data obtained from one or more automated dispenser system 101 installed in a particular facility, as is described in further detail herein.

An automated dispenser system 101 can represent a sheet product dispenser that can dispense a consumable product 110, such as sheet product, paper towels or tissues. An automated dispenser system 101 can also represent a device that dispenses liquids, gels, aerosols, or other types of consumable products 110. The automated dispenser system 101 can include a product level sensor 118 that can detect product levels of a consumable product 110. A product level sensor 118 can comprise one or more sensors that can detect how much of a consumable product 110 remains in the dispenser. The product level sensor 118 can be an optical, mechanical, electrical, or electromechanical sensor that detects how much sheet product remains in the dispenser as an approximate percentage of an unused roll of sheet product. As another example, a product level sensor 118 can detect how much of a liquid or gel remains relative to a full tank or bladder of the liquid or gel. The product level sensor 118 can detect a remaining percentage of a full allotment of another type of consumable product 110 that can be installed in the automated dispenser system 101. In other words, a product level sensor 118 can comprise one or more sensors that acts as a fuel gauge to provide an indication of how much consumable product 110 remains in the dispenser.

The automated dispenser system 101 can also include a mechanism that dispenses the consumable product 110 to a user. The dispensing of the consumable product 110 can occur based on detection of motion or proximity to the automated dispenser system 101. For example, the mechanism can include a drive roller that can dispense a portion of sheet product on a roll installed in the automated dispenser system 101 to the user. The sheet product can be installed onto one or more roll holders from which a free end of the sheet product can be extracted through a feed mechanism so that the portion is presented to the user.

The automated dispenser system 101 can include a user sensor that can detect the presence of a user so that the consumable product can be dispensed to the user. The user sensor can comprise one or more proximity sensors that can detect proximity of an object to the user sensor. A user sensor can also comprise one or more motion sensors that can detect motion. The user sensor can generate a proximity signal or motion signal in response to detection of an object within a threshold distance of the user sensor and/or motion near the automated dispenser system 101. In practice, proximity of an object within a threshold distance of the user sensor can be a user's hand, arm, or another body part, which can indicate, in certain operation modes, that a portion of an automated dispenser system 101 should be dispensed from the automated dispenser system 101.

The automated dispenser system 101 can also include a controller 121 that can execute a dispense application 139. The controller 121 can represent a processor-based instruction execution system or computing device that can be equipped with memory, input/output interfaces, a network interface 141, a data store, and potentially other computing resources. The controller 121 can be a general purpose computing device or subsystem of the automated dispenser system 101 or a special purpose computing device that is integrated into the automated dispenser system 101. In some implementations, the controller 121 can be in an external housing or located remotely from the automated dispenser system 101. The network interface 141 represents a network capability of the controller 121 that allows the controller 121 to communicate with the management system 103 via the network 106.

In the implementation shown in FIG. 1, the network interface 141 allows the automated dispenser system 101 to communicate with a dispenser hub 102 that is installed in the facility in which the automated dispenser system 101 is installed. In some implementations of the disclosure, an automated dispenser system 101 is not equipped with a wide area network capability. Instead, to reduce cost or complexity, the automated dispenser system 101 can be equipped with a network interface 141 that only enables local communication with a dispenser hub 102, which can collect data from the automated dispenser system 101 regarding consumable product 110 consumption.

The dispense application 139 can comprise software or firmware that directs operation of the automated dispenser system 101. The dispense application 139 can obtain data from a user sensor and determine whether and when to dispense consumable product 110 to the user. The dispense application 139 can also obtain data from the product level sensor 118 regarding how much consumable product 110 remains in the automated dispenser system 101. The dispense application 139 can periodically report product level data to the dispenser hub 102, which can forward product level data to the management system 103.

For example, when the product level reported by the product level sensor 118 increases to a level that is near 100%, the dispense application 139 can generate a sensor reading or event that is provided to the dispenser hub 102, which can forward the reading to the management application 108. As another example, the dispense application 139 can periodically report sensor readings from the product level sensor 118 to the dispenser hub 102, which can report them to the management application 108.

The dispenser hub 102 can represent a general purpose or special purpose computing device that can be installed within or near a facility in which one or more automated dispenser system 101 is installed. The dispenser hub 102 can represent a gateway device in an internet-of-things (IoT) deployment, while various automated dispenser systems 101 are installed in a facility as edge devices that are managed by the management system 103. The dispenser hub 102 can be installed at the facility to carry out communications, management, and other tasks on a deployment of automated dispenser systems 101 on behalf of the management system 103. The dispenser hub 102 can operate as a gateway to the network 106 or the management system 103 so that the management system 103 can manage a fleet of automated dispenser systems 101 that may not have the capability to communicate directly with the management system 103.

The hub application 143 can represent an application executed by a processor of the dispenser hub 102. The hub application 143 can facilitate management of an automated dispenser system 101 by the management system 103 and allow for a fleet of management systems 103 to be managed by a remotely executed management application 108. The hub application 143 can be executed on a dispenser hub 102 that is local to the automated dispenser system 101, such as within or near the same facility.

The client device 105 represents a computer, mobile device, or other computing device through which a user can view information provided by the management application 108 based upon data obtained from the dispenser hub 102 or from one or more automated dispenser system 101. The client device 105 can represent a smartphone, laptop computer, desktop computer, connected speaker, or any other device that can present content to a user. To this end, the client device 105 can execute a client application 140. The client application 140 can represent a browser that can render content pages provided by the management application 108, for example, to the client device 105. The dispense application 139 can also represent a console application that allows an administrator to view and manage one or more automated dispenser system 101 using the management application 108.

Using the client application 140, a facilities manager can view waste metrics 113, replenishment events 115, order recommendations generated by the management application 108, and place orders for additional inventory of consumable product 110 that can be used to replenish one or more automated dispenser system 101 in a facility. In some examples, the management application 108 can generate orders that are submitted directly to a distributor for additional consumable product 110 based upon the usage data collected from the dispenser hub 102 on behalf of the automated dispenser systems 101 in a facility that are being managed by the management application 108. In another example, the management application 108 can generate an order that is presented to a user via the dispense application 139, and the user can edit or submit the order that is generated by the management application 108.

Figure 2:
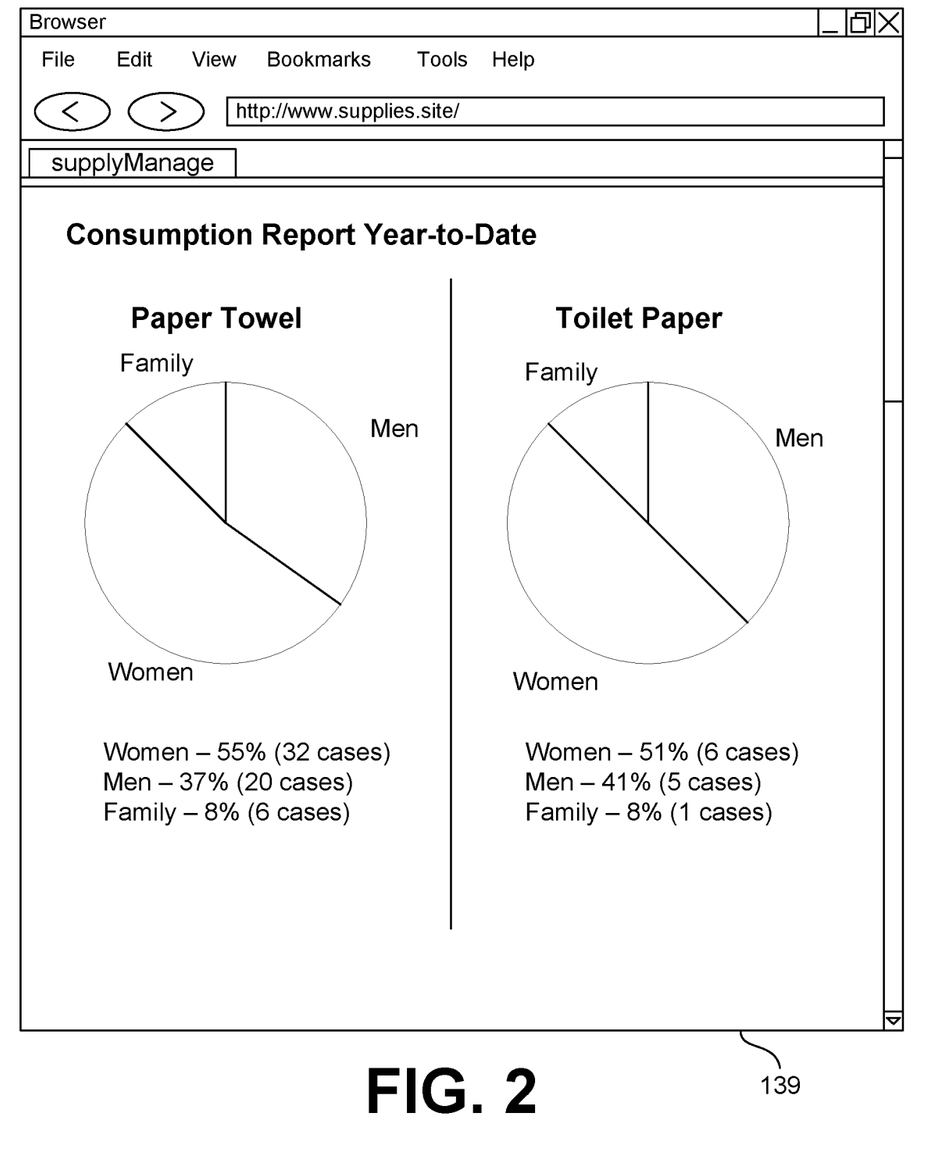
FIG. 2 is an example of a user interface according to embodiments of the disclosure.

Referring next to FIG. 2, shown is an example user interface that can be rendered by the client application 140 on a client device 105. The user interface can be generated by the management application 108 and sent to the client device 105 over the network 106. The user interface can be generated by the management application 108 based upon usage data stored in the data store 111. The usage data can be obtained from the dispenser hub 102 on behalf of various automated dispenser systems 101 that are managed by the management application 108 in one or more facilities. As noted above, the automated dispenser system 101 can be configured to report product level data from a product level sensor 118 in the automated dispenser system 101.

The management application 108 can calculate consumption data from the product level data by calculating how many times automated dispenser systems 101 that are managed by the management application 108 were replenished, or refilled, by the staff in the facility. Each time the management application 108 detects that an automated dispenser system 101 was refilled, the management application 108 can generate a replenishment event 115 that is stored in the data store 111. Based upon the type of automated dispenser system 101, the management application 108 can identify a type of consumable product 110 that was used when a replenishment event 115 for the automated dispenser system 101 is detected. The management application 108 can also sort replenishment events 115 by a type of washroom or environment in which the automated dispenser system 101 is installed. For example, the management application 108 can separate replenishment events 115 into categories by a type of washroom with which they are associated, a floor of a facility, a region of a facility, or other categories into which visibility might be desired by a facilities manager.

By tabulating replenishment events 115 during a particular time period for a type of automated dispenser system 101, the management application 108 can calculate consumption of the various types of consumable product 110 that are used in the facility as well as calculate consumption of different types of consumable product 110 according to a type of washroom environment, such as women's washrooms, men's washrooms, unisex washrooms, family washrooms, or other categories into which they can be divided.

The usage of consumable product 110 can be displayed in the user interface generated by the management application 108 using charts, graphics, trendlines, and other visual representations of the data. Additionally, the consumption can be broken down by the type of consumable product 110 and the type of washroom in which the consumption has occurred.

Figure 3:
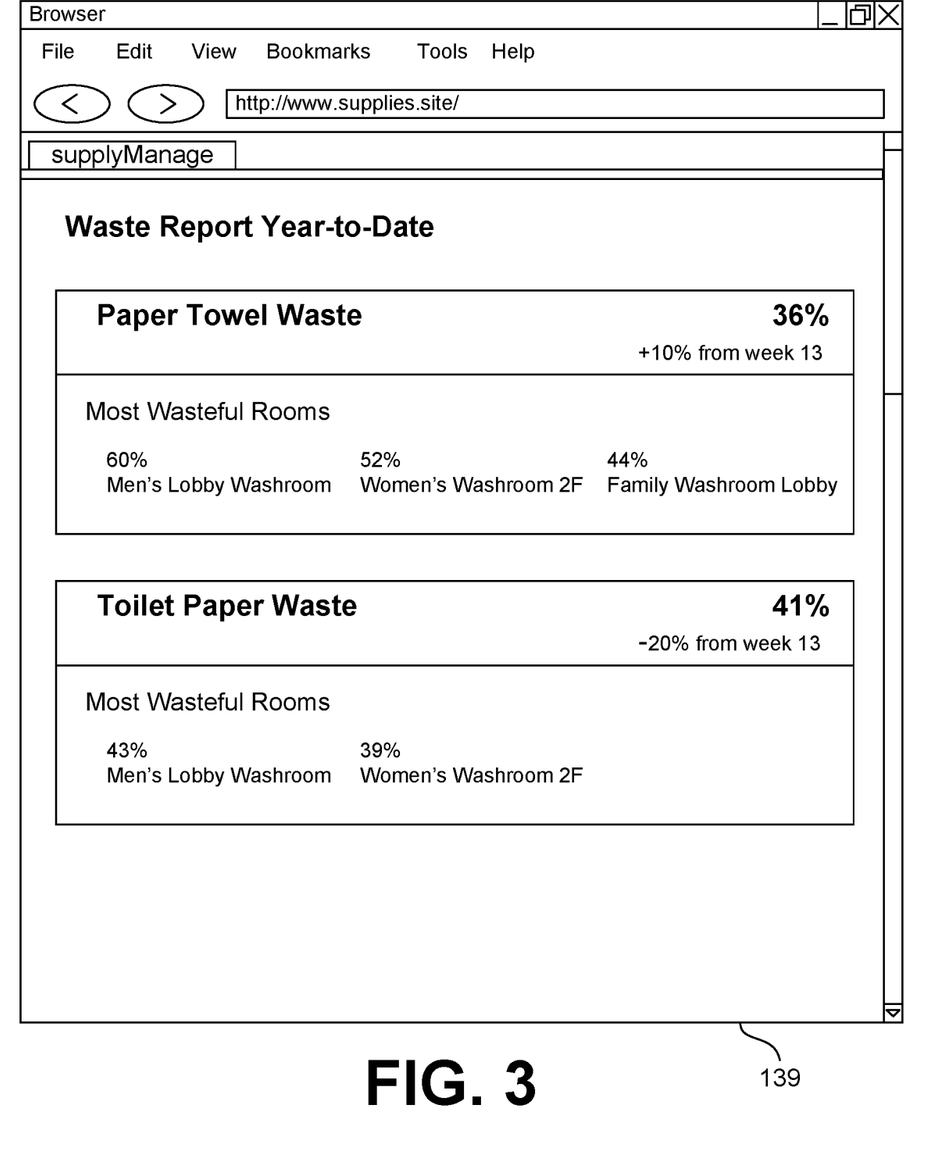
FIG. 3 is an example of a user interface according to embodiments of the disclosure.

Referring next to FIG. 3, shown is a user interface generated by the management application 108 that displays waste statistics that can be calculated from the waste metric 113 that is stored when a replenishment event 115 occurs. As noted above, the waste metric 113 can be calculated for a particular replenishment event 115 and stored in the data store 111. The waste metric 113 can be associated with the amount of consumable product 110 that was unused and/or discarded when the consumable product 110 in the automated dispenser system 101 was replaced by facilities staff.

Accordingly, the management application 108 can allow a user to visualize the amount of waste associated with a facility in various ways. The visualizations can be generated by calculating the amount of aggregate waste of the various types of consumable product 110 utilized by the facility over a particular time period. For example, the management application 108 can generate a user interface that is displayed by the client application 140 that allows the user to visualize the amount of waste of the various types of consumable product 110 year-to-date, or over a given day, week, or month.

Additionally, the management application 108 can identify outlier washrooms or outlier automated dispenser systems 101 that are the most wasteful automated dispenser systems 101 or washrooms based on the calculated waste metrics 113. The management application 108 can also display trends that are associated with historical waste metrics 113 so that a user can visualize whether waste of consumable product 110 in the facility is improving or worsening.

Figure 4:
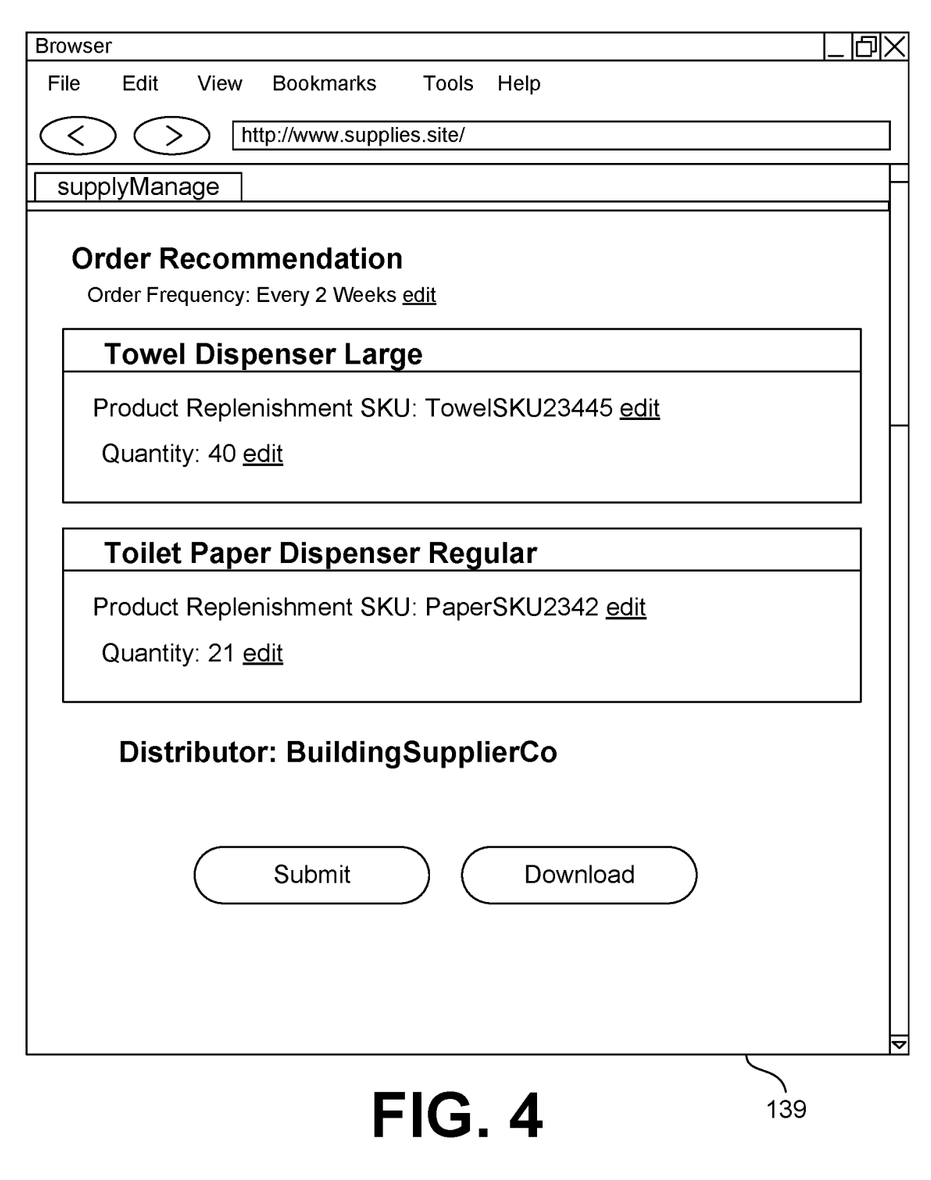
FIG. 4 is an example of a user interface according to embodiments of the disclosure.

Referring next to FIG. 4, shown is a user interface generated by the management application 108 that displays order recommendations generated by the management application 108 based upon the waste metric 113 and replenishment event 115 in the data store 111. The order recommendation can be based upon an amount of consumable product 110 calculated to have been consumed over a particular time period. Accordingly, the order recommendation can include a quantity of different items, or stock replenish the inventory of consumable product 110 based upon the amount that was consumed.

In one example, the management application 108 can allow the user to edit an order frequency so that an order recommendation is generated every week, month, or based upon a selectable time frequency. Additionally, the management application 108 can maintain an inventory of automated dispenser systems 101 that are installed in a facility as well as a product identifier for a refill of consumable product 110 that is used for each automated dispenser system 101.

The management application 108 can submit a recommended order directly to a distributor by using an ordering application programming interface (API) through which the distributor can receive the order, by emailing a copy of the recommended order to the distributor, or other electronic transmission mechanisms. Additionally, the management application 108 can allow the user to download a copy of the recommended order if the user wishes to submit the order to the distributor.

Figure 5:
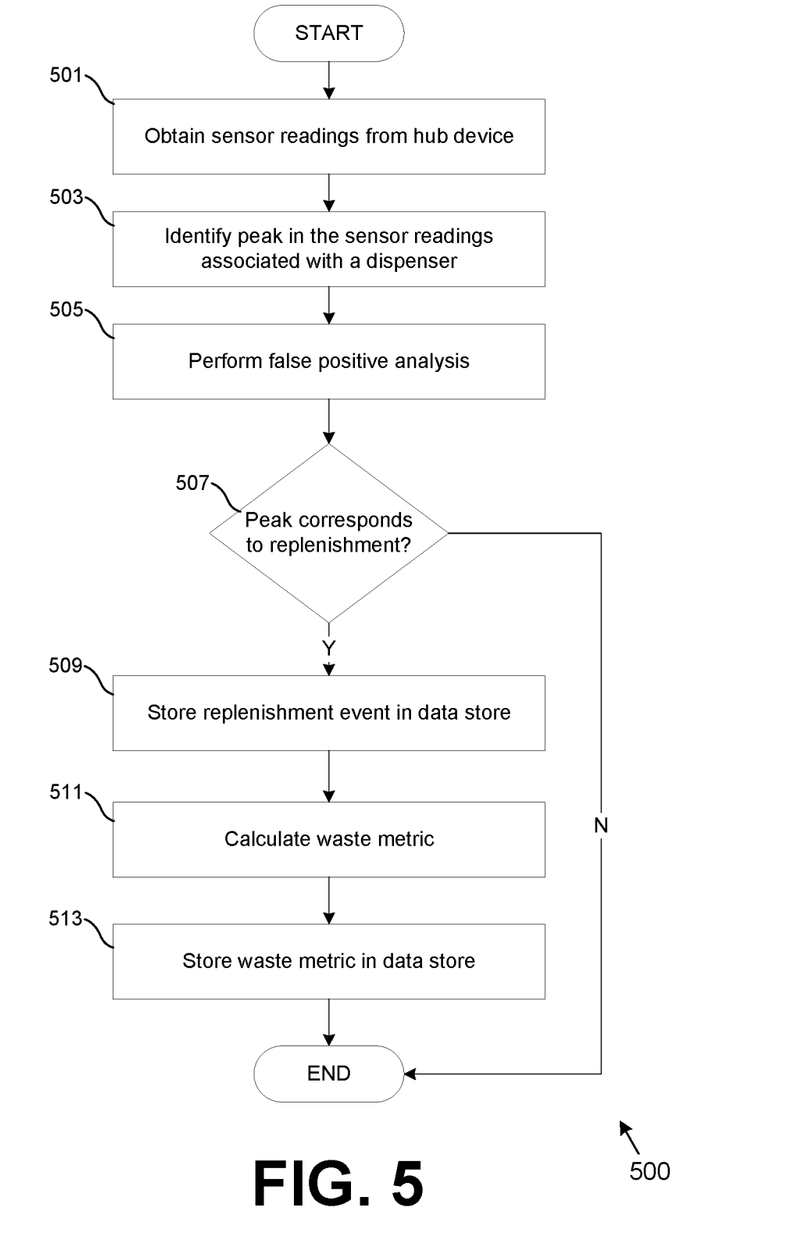
FIG. 5 is an example of a flowchart according to embodiments of the disclosure.

Reference is now made to FIG. 5, which illustrates flowchart 500. The flowchart 500 of FIG. 5 is meant to depict a process or a method according to the disclosure. The method can be carried out by the management application 108 according to various embodiments. The method illustrated by FIG. 5 shows how the management application 108 can store a replenishment event 115 and/or a waste metric 113 in the data store 111 in response to receiving sensor readings corresponding to a plurality of measurement times. The sensor readings can be obtained from a product level sensor 118 in an automated dispenser system 101.

First, at step 501, the management application 108 can obtain sensor readings that correspond to an automated dispenser system 101. The sensor readings can correspond to readings from a product level sensor 118 in an automated dispenser system 101. The sensor readings can be obtained from a dispenser hub 102 that is installed locally at the facility in which the automated dispenser system 101 is installed. The dispenser hub 102 can act as an IoT gateway device that connects the automated dispenser system 101 to the network 106 and to the management system 103. In some embodiments, the sensor readings can be obtained directly from the automated dispenser system 101 if the automated dispenser system 101 can communicate directly with the network 106 or a wide-area network.

In some implementations, the management application 108 can obtain multiple sensor readings, such as a plurality of sensor readings over a time window. The multiple sensor readings allow the management application 108 to detect a replenishment event 115 by determining that a product change, or a product replenishment event 115, has occurred.

At step 503, the management application 108 can identify a peak in the sensor readings obtained from the automated dispenser system 101. A peak in the sensor readings can be detected by determining that the product level as detected by the product level sensor 118 is a threshold percentage higher than a preceding sensor reading. In other words, if the product level sensor 118 reports that the product level is 100%, the immediately preceding sensor reading reported that the product level was 40%, and the threshold percentage is 20%, the management application 108 can determine that a peak in the sensor readings has occurred.

A peak in the sensor readings can also be detected by determining that the product level as detected by the product level sensor 118 is a threshold percentage higher than a preceding sensor reading. In other words, if the product level sensor 118 reports that the product level is 100%, the immediately preceding sensor reading reported that the product level was 40%, and the threshold percentage is 20%, the management application 108 can determine that a peak in the sensor readings has occurred. As another example, if the product level sensor 118 reports that the product level is higher than an immediate predecessor reading, the management application 108 can determine that a peak in the sensor readings has occurred.

Upon identifying a peak in the sensor readings from the product level sensor 118, the management application 108, at step 505, can perform a false positive analysis on the sensor readings to confirm whether the peak corresponds to a replenishment event 115. In one example of the false positive analysis, the management application 108 can analyze at least two successive sensor readings to confirm that the peak corresponds to a replenishment event 115. The management application 108 can determine if the two subsequent readings that follow the detected peak are higher than a product level immediately prior to the peak, that the peak corresponds to a replenishment event 115.

In one implementation, the management application 108 can determine that the peak corresponds to a replenishment event 115 only if the first sensor reading that follows the detected peak is at least 20% higher than the sensor reading prior to the peak and the second sensor reading following the peak is higher than the sensor reading prior to the peak. Different percentages and thresholds can be chosen without departing from embodiments from the disclosure if an analysis of at least two sensor readings following a detected peak is performed. If the peak fails the false positive analysis because the management application 108 determines that at least two subsequent sensor readings do not indicate a replenishment event 115, the management application 108 can continue monitoring sensor readings for a peak in sensor readings to detect a replenishment event 115.

After performing the false positive analysis, the management application 108, at step 507, can determine whether the peak detected at step 503 corresponds to a replenishment event 115. If the peak does not correspond to a replenishment event 115 because the peak did not pass the false positive analysis, the process can proceed to completion. If the peak does correspond to a replenishment event 115, the process can proceed to step 509.

At step 509, the management application 108 can store a replenishment event 115 in the data store 111. The replenishment event 115 can be stored along with a timestamp and identifying information about the automated dispenser system 101 and/or the dispenser hub 102 the which the sensor data corresponds. For example, the identifying information can include a unique identifier of the automated dispenser system 101 as well as a model number or type of the automated dispenser system 101. The unique identifier of the automated dispenser system 101 can be mapped to a particular location in a particular facility so that the management application 108 can later present information about waste and consumption of consumable product 110 in connection with the automated dispenser system 101 and others in the facility.

Next, at step 511, the management application 108 can calculate a waste metric 113 associated with the replenishment event 115. As noted above, the waste metric 113 can correspond to an amount of consumable product 110 that will be presumably discarded because the consumable product 110 was not completely exhausted when the replenishment event 115 occurred. The waste metric 113 can be calculated by identifying an amount of consumable product 110 remaining in the automated dispenser system 101 as specified by a sensor reading that immediately precedes the peak detected at step 503. The amount of consumable product 110 as specified by the sensor reading immediately preceding the peak is presumed to be wasted. In some examples, the waste metric 113 can be reduced by an amount that compensates for a stub roll of consumable product 110 that does not actually constitute sheet product. The product level sensor 118 can be associated with a baseline empty sensor reading from which the amount by which the waste metric 113 is reduced can be calculated. The baseline empty sensor reading can be a non-zero reading that constitutes an empty automated dispenser system 101. Accordingly, to calculate the waste metric 113, the management application 108 can subtract the baseline empty sensor reading from the predecessor reading.

At step 513, the management application 108 can store the waste metric 113 in the data store 111. The waste metric 113 can be stored along with a timestamp and identifying information about the automated dispenser system 101 and/or the dispenser hub 102 the which the sensor data corresponds. For example, the identifying information can include a unique identifier of the automated dispenser system 101 as well as a model number or type of the automated dispenser system 101. The unique identifier of the automated dispenser system 101 can be mapped to a location in a particular facility so that the management application 108 can later present information about waste and consumption of consumable product 110 in connection with the automated dispenser system 101 and others in the facility.

Thereafter, the process proceeds to completion.

Figure 6:
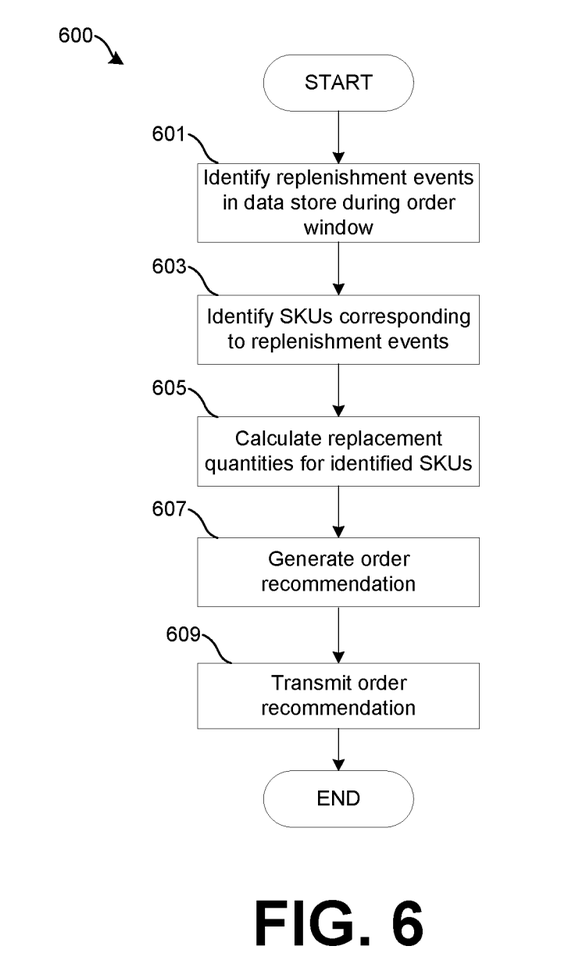
FIG. 6 is an example of a flowchart according to embodiments of the disclosure.

Reference is now made to FIG. 6, which illustrates a flowchart 600. The flowchart 600 of FIG. 6 is meant to depict a process or a method according to the disclosure. The method can be carried out by the management application 108 according to various embodiments. The method illustrated by FIG. 6 shows how the management application 108 can generate an order recommendation based upon replenishment event 115 that are stored in the data store 111.

First, at step 601, the management application 108 can identify replenishment events 115 for a facility that occurred since a previous order was made for restocking an inventory of consumable product 110 for the facility. The replenishment events 115 can correspond to items in inventory that were consumed during an order window.

Next, at step 603, the management application 108 can identify product identifiers, or stock keeping units (SKUs), that correspond to the consumable product 110 used during the order window. The SKUs can vary depending upon which automated dispenser systems 101 are deployed in the facility. A mix of different automated dispenser systems 101 might be deployed in the facility and require different SKUs for replacement consumable product 110. For example, a first model of an automated dispenser system 101 might use a different type of consumable product 110 refill than a second model of the automated dispenser system 101. The SKUs can be identified based on a product database that is accessible to the management application 108. The product database can map different types of automated dispenser system 101 to a SKU or type of refill of consumable product 110.

At step 605, the management application 108 can calculate a replacement quantity for each of the identified SKUs. The replacement quantity can be calculated by counting a quantity of replenishment events 115 during the order window that correspond to a consumable product 110. Once the quantity of replenishment events 115 is determined, a SKU that includes the type of consumable product 110 can be identified.

Next, at step 605, a quantity of the SKU can be identified based upon the quantity of replacement events 115 that occurred during the order window. For example, the if the management application 108 determines that ten refills of a consumable product 110 were consumed during the order window and a SKU exists that includes ten refills of the consumable product 110, a single item of the SKU containing ten refills can be chosen. The management application 108 can determine a quantity of SKUs based on an aggregate analysis of the replenishment event 115 that occurred during the order window or since a last order was submitted on behalf of the facility.

At step 607, the management application 108 can generate an order recommendation. The order recommendation can comprise a quantity of SKUs or product identifiers that would restock the inventory of consumable product 110 that was consumed during the order window or since a previous order recommendation was generated.

At step 609, the order recommendation can be transmitted. The order recommendation can be included in a user interface generated by the management application 108, emailed to an email address, or provided in another viewing format. In some implementations, the order recommendation can be submitted as an order to a distributor utilized by the facility for the SKUs that are incorporated in the order recommendation. Thereafter, the process can proceed to completion.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that measurements, amounts, and other numerical data can be expressed herein in a range format. It is also understood that there are a number of values disclosed herein, and that each value is also herein disclosed as "approximately" that particular value in addition to the value itself. For example, if the value "10" is disclosed, then "approximately 10" is also disclosed. Similarly, when values are expressed as approximations, by use of the antecedent "approximately," it will be understood that the particular value forms a further aspect. For example, if the value "approximately 10" is disclosed, then "10" is also disclosed.

As used herein, the terms "about," "approximately," "at or about," and "substantially equal" can mean that the amount or value in question can be the exact value or a value that provides equivalent results or effects as recited in the claims or taught herein. That is, it is understood that amounts, sizes, measurements, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In general, an amount, size, measurement, parameter or other quantity or characteristic is "about," "approximate," "at or about," or "substantially equal" whether or not expressly stated to be such. It is understood that where "about," "approximately," "at or about," or "substantially equal" is used before a quantitative value, the parameter also includes the specific quantitative value itself, unless specifically stated otherwise.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

Such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system comprising:
   an automated dispenser system comprising a sensor configured to identify an amount of consumable product remaining in the automated dispenser system; and
   an application executable by a processor, the application executed remotely from the automated dispenser system and, when executed by the processor, causing the processor to at least:
      obtain a plurality of sensor readings corresponding to the sensor associated with the automated dispenser system, the sensor readings corresponding to the amount of the consumable product at a plurality of measurement times;
      identify a peak in the plurality of sensor readings relative to a previous one of the sensor readings;
      determine that the peak in the plurality of sensor readings corresponds to a replenishment of the consumable product in the automated dispenser system based on a false positive analysis of the peak and at least one subsequent sensor reading;
      store a replenishment event in a data store in response to determining that the peak corresponds to the replenishment of the consumable product;
      calculate a waste metric based upon the peak and the at least one subsequent sensor reading; and
      store the waste metric in the data store.

2. The system of claim 1, wherein the application further causes the processor to determine that the peak in the plurality of sensor readings corresponds to the replenishment by causing the processor to at least:
   determine that a respective one of the sensor readings meets a threshold reading;
   determine that a predecessor sensor reading is lower than the threshold reading; and
   determine that at least two subsequent sensor readings following the peak are higher than the predecessor reading.

3. The system of claim 2, wherein the application further causes the processor to determine that the peak in the plurality of sensor readings corresponds to the replenishment by causing the processor to at least:

determine that a first subsequent sensor reading following the peak is twenty percent greater than the predecessor reading and determining that a second subsequent sensor reading following the peak is greater than the predecessor reading.

4. The system of claim 1, wherein the application further causes the processor to at least:
identify a second peak in the plurality of sensor readings relative to a second previous one of the sensor readings;
determine that the second peak in the plurality of sensor readings corresponds to a false positive reading based on the false positive analysis and the at least one subsequent sensor reading; and
determine that a subsequent sensor reading corresponds to the replenishment by determining that the subsequent sensor reading exceeds a predecessor reading by more than a threshold amount.

5. The system of claim 1, wherein the application calculates the waste metric by causing the processor to at least:
identify a product level associated with a predecessor reading immediately preceding the peak;
determine that the consumable product is associated with a baseline empty sensor reading, the baseline empty sensor reading comprising a quantity detected by the sensor that is associated with zero waste; and
calculate the waste metric by subtracting the baseline empty sensor reading from the predecessor reading.

6. The system of claim 1, wherein the application calculates the waste metric by causing the processor to at least:
calculate a difference between the peak and a predecessor reading immediately preceding the peak, wherein the difference comprises the waste metric.

7. The system of claim 1, wherein the application further causes the processor to at least:
determine, for a time period, a quantity of replenishment events stored in the data store for a plurality of automated dispenser systems associated with a facility; and
generate an order recommendation to replenish an inventory of consumable product for the facility based upon the quantity of replenishment events during the time period.

8. A method comprising:
obtaining, by a computing device executed remotely from an automated dispenser system, a plurality of sensor readings corresponding to a sensor associated with the automated dispenser system, the sensor readings obtained from a hub device associated with a facility with a plurality of automated dispenser systems, the hub device in local communication with the automated dispenser system and further in communication with the computing device over a wide area network, the hub device operating as a gateway to the wide area network on behalf of the automated dispenser system;
identifying, by the computing device, a peak in the plurality of sensor readings relative to a previous one of the sensor readings, the sensor readings corresponding to an amount of a consumable product in the automated dispenser system at a plurality of measurement times;
determining, by the computing device, that the peak in the plurality of sensor readings corresponds to a replenishment of the consumable product in the automated dispenser system based on a false positive analysis of the peak and at least one subsequent sensor reading;
storing, by the computing device, a replenishment event in a data store accessible to the computing device in response to determining that the peak corresponds to the replenishment of the consumable product;
calculating, by the computing device, a waste metric based upon the peak and the at least one subsequent sensor reading; and
storing, by the computing device, the waste metric in the data store.

9. The method of claim 8, wherein determining that the peak in the plurality of sensor readings corresponds to the replenishment further comprises:
determining, by the computing device, that a respective one of the sensor readings meets a threshold reading;
determining, by the computing device, that a predecessor sensor reading is lower than the threshold reading; and
determining, by the computing device, that at least two subsequent sensor readings following the peak are higher than the predecessor reading.

10. The method of claim 9, wherein determining that the peak in the plurality of sensor readings corresponds to the replenishment further comprises:
determining, by the computing device, that a first subsequent sensor reading following the peak is twenty percent greater than the predecessor reading and determining that a second subsequent sensor reading following the peak is greater than the predecessor reading.

11. The method of claim 8, further comprising:
identifying, by the computing device, a second peak in the plurality of sensor readings relative to a second previous one of the sensor readings;
determining, by the computing device, that the second peak in the plurality of sensor readings corresponds to a false positive reading based on the false positive analysis and the at least one subsequent sensor reading; and
determining, by the computing device, that a subsequent sensor reading corresponds to the replenishment by determining that the subsequent sensor reading exceeds a predecessor reading by more than a threshold amount.

12. The method of claim 8, wherein calculating the waste metric further comprises:
identifying, by the computing device, a product level associated with a predecessor reading immediately preceding the peak;
determining, by the computing device, that the consumable product is associated with a baseline empty sensor reading, the baseline empty sensor reading comprising a quantity detected by the sensor that is associated with zero waste; and
calculating, by the computing device, the waste metric by subtracting the baseline empty sensor reading from the predecessor reading.

13. The method of claim 8, wherein calculating the waste metric further comprises:
calculating, by the computing device, a difference between the peak and a predecessor reading immediately preceding the peak, wherein the difference comprises the waste metric.

14. The method of claim 8, further comprising:
determining, by the computing device, for a time period, a quantity of replenishment events stored in the data store for a plurality of automated dispenser systems associated with a facility; and
generating, by the computing device, an order recommendation to replenish an inventory of consumable product for the facility based upon the quantity of replenishment events during the time period.

15. A system comprising:
- a plurality of automated dispenser systems respectively comprising a sensor configured to identify an amount of consumable product remaining in the automated dispenser system;
- a hub device in local communication with the automated dispenser systems, the hub device operating as a gateway on behalf of the automated dispenser systems to a wide area network; and
- an application executable by at least one computing device, the at least one computing device in communication with the hub device over the wide area network, when executed by the at least one computing device, causing the at least one computing device to at least:
    - obtain a plurality of sensor readings from the hub device corresponding to the sensor associated with one of the automated dispenser systems, the sensor readings corresponding to the amount of the consumable product at a plurality of measurement times;
    - identify a peak in the plurality of sensor readings relative to a previous one of the sensor readings;
    - determine that the peak in the plurality of sensor readings corresponds to a replenishment of the consumable product in the automated dispenser system based on a false positive analysis of the peak and at least one subsequent sensor reading;
    - store a replenishment event in a data store in response to determining that the peak corresponds to the replenishment of the consumable product;
    - calculate a waste metric based upon the peak and the at least one subsequent sensor reading; and
    - store the waste metric in the data store.

16. The system of claim 15, wherein the application identifies the peak in the plurality of sensor readings corresponds to the replenishment by:
- determining that a respective one of the sensor readings meets a threshold;
- determining that a predecessor sensor reading is lower than the threshold; and
- determining that at least two subsequent sensor readings following the peak are higher than the predecessor reading.

17. The system of claim 16, wherein the application further identifies the peak in the plurality of sensor readings corresponds to the replenishment by:
- determining that a first subsequent sensor reading following the peak is twenty percent greater than the predecessor reading and determining that a second subsequent sensor reading following the peak is greater than the predecessor reading.

18. The system of claim 15, wherein the application further causes the at least one computing device to at least:
- identify a second peak in the plurality of sensor readings relative to a second previous one of the sensor readings;
- determine that the second peak in the plurality of sensor readings corresponds to a false positive reading based on the false positive analysis and the at least one subsequent sensor reading; and
- determine that a subsequent sensor reading corresponds to the replenishment by determining that the subsequent sensor reading exceeds a predecessor reading by more than a threshold amount.

19. The system of claim 15, wherein the application calculates the waste metric by at least:
- identifying a product level associated with a predecessor reading immediately preceding the peak;
- determining that the consumable product is associated with a baseline empty sensor reading, the baseline empty sensor reading comprising a quantity detected by the sensor that is associated with zero waste; and
- calculating the waste metric by subtracting the baseline empty sensor reading from the predecessor reading.

20. The system of claim 15, wherein the at least one application calculates the waste metric by at least:
- calculating a difference between the peak and a predecessor reading immediately preceding the peak, wherein the difference comprises the waste metric.

* * * * *